Patented Sept. 1, 1936

2,053,173

UNITED STATES PATENT OFFICE 2,053,173

SHADOW PRODUCING SCREEN FOR LUMINOUS PROJECTIONS AND OTHER APPLICATIONS AND PROCESS FOR ITS MANUFACTURE

Eugène Astima, Paris, France

Application May 11, 1931, Serial No. 536,618
In France May 14, 1930

5 Claims. (Cl. 88—24)

The object of the present invention is a new industrial product consisting in a screen so contrived that it permits of the passage of luminous rays which impinge upon its surface in a normal, or practically normal direction but arrests the passage of those rays which impinge upon it in a vertical or oblique direction, this result being obtained by the presence in the thickness of the screen itself of a system of opaque lines or of a system of opaque lines combined with a system of colored transparent lines or again of one or of two systems of colored transparent lines.

A further object of the invention is the process of manufacture of such a screen.

The screen built conformably to the invention is essentially composed of a sheet or plate of a suitable transparent substance, said sheet or plate possessing in its thickness either a great number of opaque zones, preferably very thin and very close to one another, or, at the same time, a set of the aforesaid zones and, in combination therewith, a set of transparent zones of a suitable color and set at a suitable angle to the opaque zones, or else two sets of colored transparent zones also set at a suitable angle one to the other.

The transparent substance employed to make the aforementioned sheet or plate may be of any nature. One may, for instance, employ acetate of cellulose, hydrate of cellulose or any other similar substance and in this case it is advantageous to make up the screen by superimposing, and sticking or welding together, a suitable number of sheets of the substance selected (opaque zones being provided in the block thus obtained and spaced regularly or not), and then to cut slabs or sheets from the said block thus making as many distinct screens. The opaque zones may be produced, during the assembling together of the sheets, either by applying layers of ink, varnish etc., or by inserting opaque sheets, black for preference, of the same substance, or by producing dark, opaque, zones or colored transparent zones on the spot by a photo-chemical process for instance.

It should be understood that these various methods of manufacturing the screen are given purely as an indication and that the invention is not, in any way, limited to the methods in question.

In the attached drawings two methods of application of the manufacturing process of a screen, constructed conformably to the invention have been shown in diagram and solely as examples.

Figure 1:
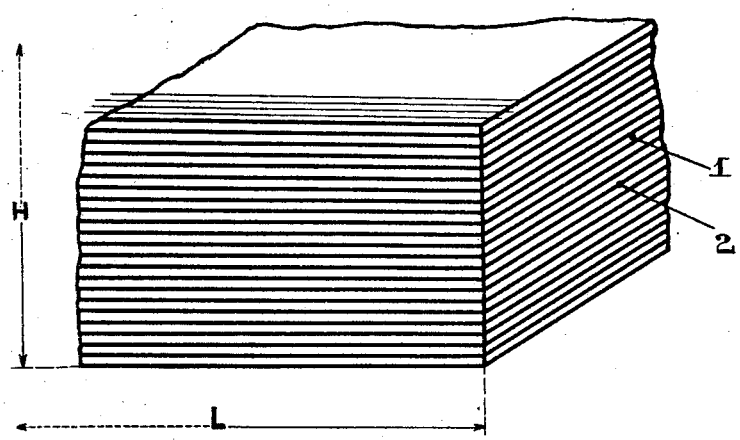
Figure 1 is a representation on an enlarged scale of a fragment of a block in course of construction, said block being formed by the superimposition and the sticking or welding together of a large number of sheets or very small thickness of a suitable transparent substance.

As shown in Figure 1 to make up a block for the manufacture of screens conformably to the invention, a certain number of thin sheets of a suitable transparent substance, such as acetate of cellulose, are superimposed by sticking or welding them together. Sheets 1 are employed, one side of which is of a length L equal to the width it is intended to give the screens (or portions of screens) and a sufficient number of such sheets is superimposed to obtain a thickness H corresponding to the height it is intended to give the screens or portions of screens.

During the course of the aforementioned operation, before sticking a sheet onto the preceding one, a layer 2 of an opaque substance, such as black printer's ink or black varnish for example, is applied onto the latter. A new sheet 1 is applied on the top of layer 2 thus applied, then another layer 2 and so on until the block is of the desired height H. The layer of opaque substance may also be replaced by a thin opaque sheet, black for preference, and of the same substance as sheet 1.

Once the block has thus been made up it is sliced according to vertical planes as indicated in composite broken section lines in Figure 1 into a certain number of slabs or sheets, the thickness of each slab thus sliced off corresponding to the thickness it is intended to give to the composite screen.

To make things plain, and without this indication limiting the peculiarities of the invention in any way, it may be stated that the thickness of the sheet intended to form the screen may be about 0.03937" and that the primary sheets employed to make up the block will be less by half. Consequently, in the finished screen, the opaque zones will be spaced 0.019685" part.

Figure 2:
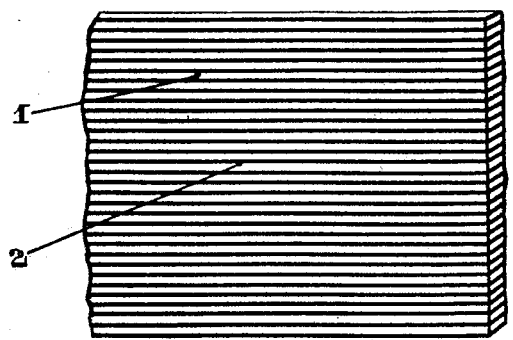
Figure 2 represents a portion of a screen obtained by slicing of the block shown in Figure 1.
Figure 3:
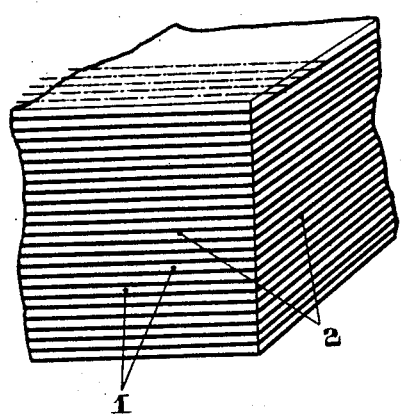
Figure 4:
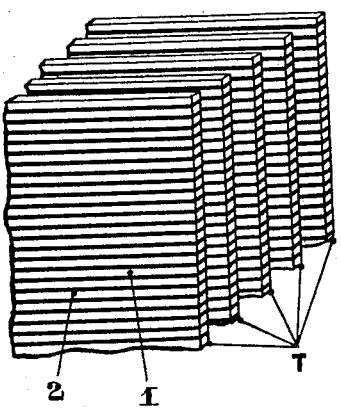
Figure 5:
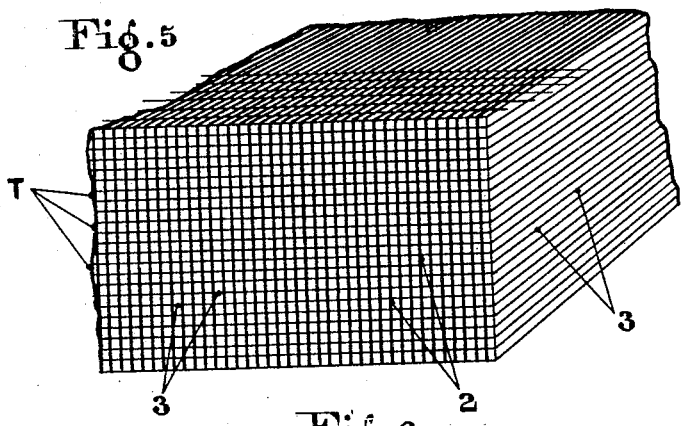

As shown in Figure 2, sheets of transparent matter are thus obtained which contain, in their thickness a large number of parallel opaque zones, horizontal for preference, said zones extending throughout the thickness of the sheet. In other words a screen bearing lines is thus obtained.

Owing to the fineness of the dark zones these are practically invisible to the observer and, by their close proximity, a "toned" effect is obtained which is particularly pleasing.

On the other hand when the screen is made of a substance such as acetate of cellulose it is flexible and may be rolled which considerably facilitates transportation and storage.

The process of manufacture above described is applicable to the making of screens comprising a combination of a system of opaque zones and of a system of colored transparent zones, which screens produce the same results as are obtainable through another method by the arrangement which forms the subject matter of a patent registered in France by the applicant on April 24, 1930 under the denomination: "Arrangement applicable to projection screens ensuring the visibility of luminous projections carried out in illuminated locations."

Figures 3 to 6 show how this application is effected: a block similar to that in Figure 1 is first set up (Figure 3) exactly in the same manner as in the case of lined screens and this block is sliced into slabs or sheets T (Figure 4) of small thickness.

Figure 6:
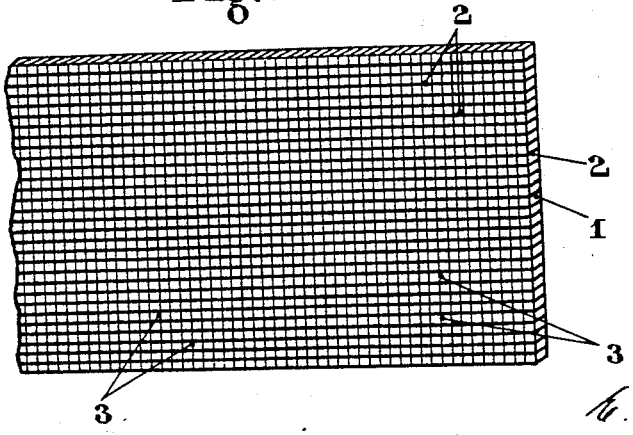

By employing slabs T in the same manner as sheets I were employed, and by inserting between the said slabs thin sheets of a transparent substance (hydrate of cellulose for instance) suitably colored or by applying layers S of suitable transparent color (varnish for instance), a second block (Figure 5) is made up which, by slicing it into slabs, produces the screen of which Figure 6 shows a fragment. In order to be certain that the opaque zones shall coincide it will be sufficient to pile up slabs T between suitably arranged guides.

The aforementioned operations might of course be executed in the reverse order, that is to say one might first set up a block comprising colored transparent zones, then slice it into slabs and use them for the making up of the second block.

One may, for certain applications, replace the system of opaque zones by a system of colored transparent zones.

In the following the description will refer more particularly to the application of such a screen for the purpose of luminous projections in an illuminated location, but the invention is not limited to this particular case and, as will be set forth hereinunder it is suitable for a number of other uses.

Various arrangements have already been offered which make it possible for the production of fixed or moving luminous projections in illuminated locations. As a general rule such arrangements already known comprise the combination with the screen proper of a system of cells or blades disposed in front of the screen (in relation to the observer), the purpose of the said blades or cells being to shade more or less completely that side of the screen turned towards the observer. By this artifice the projection becomes visible even when the location in front of the screen is normally lighted.

The shade producing screen applied for the purpose of luminous projections in illuminated locations set up conformably with the invention differs from the aforementioned devices by the fact that it constitutes an integral whole with the device provided for keeping the front part of the screen shaded.

For this application it is sufficient to dull that face of the screen placed at the rear, relatively to the observer, in the case of projections by transparency or to render such dulled face opaque in the case of projection by reflection, while noting that it may be advisable to dull the other face slightly in order to avoid mirroring back during projections.

The method of employing the lined screen above described is readily conceivable:

The projection onto the screen may be either by transparency (in which supposition the rear face of the screen is placed in darkness by any suitable means such as a provision of a "camera obscura" behind the screen for instance), or by reflection. In these two cases owing to the presence of the shade producing zones provided within the thickness of the screen, said screen is preserved from the action of the luminous rays illuminating the location where the projection is being made. Under these conditions the projection is visible to the observer in as satisfactory a manner as if it were made on an ordinary screen placed in an unlighted location.

The screen which forms the subject matter of the invention may be applied for other purposes than that of the projection of pictures above considered. Thus it may be employed to improve visibility, in illuminated locations, of television receiving devices, lanterns or luminous signs, luminous signals etc. In some of these applications it may be desirable to make the screen with a sheet of colored glass incorporating the zones in question in its thickness.

A particularly interesting application of the invention may be made in constructing screens intended as sun-visors; such screens making it possible to preserve one's self from the rays of the sun while retaining perfect visibility by transparency. They may be employed, for instance, on all kinds of vehicles, automobiles, railway coaches, etc., to protect the occupants from the inconvenient effects of sun-light without preventing the said occupants from seeing out through the windows of the vehicle.

Such sun-visor screens may be utilized in replacement of ordinary windows or panes or else they may be placed on these windows or panes; in such cases it will be particularly convenient to make them from a substance such as acetate of cellulose so that they may be flexible and capable of being rolled up in the same way as a blind or a curtain. It follows necessarily that they may be employed with the same result in view to all windows.

I claim:

1. A process of manufacture of shadow producing screens, comprising the steps of superimposing, and sticking together, sheets of a transparent substance such as acetate of cellulose in order to form a block, inserting opaque zones in the course of assembling said sheets, said opaque zones being obtained by the application of layers of black ink and cutting sheets from the said block thus constituting a number of distinct screens.

2. A screen of the type described comprising a plurality of layers formed of a transparent substance, said layers each having the same color, and layers of an opaque substance interposed between adjacent layers of the said transparent substance, said screen being dulled on a face adapted to receive a projected image.

3. A screen of the type described comprising a plurality of layers formed of a cellulose salt, and a layer of opaque material interposed between adjacent layers of said cellulose salt, said screen being dulled on one face thereof over areas including a plurality of said layers formed of the cellulose salt.

4. A screen of the type described comprising a plurality of opaque layers intersecting one another, and a transparent substance filling the spaces between said opaque layers, said screen being dulled on one face thereof adapted to receive a projected image.

5. A screen for producing shadows comprising a plurality of layers formed from a transparent substance, said layers each having the same color and layers of an opaque substance interposed between neighboring layers of said transparent substance, said screen being rendered opaque upon the face for receiving the projected image.

EUGÈNE ASTIMA.